Dec. 11, 1934.  W. RYAN  1,984,157
FURNACE
Filed March 30, 1931
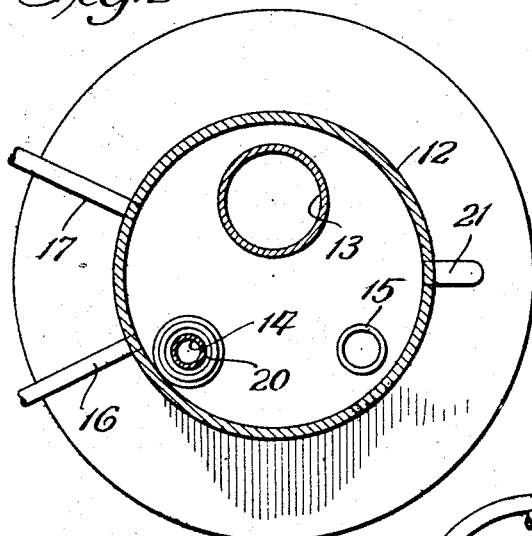
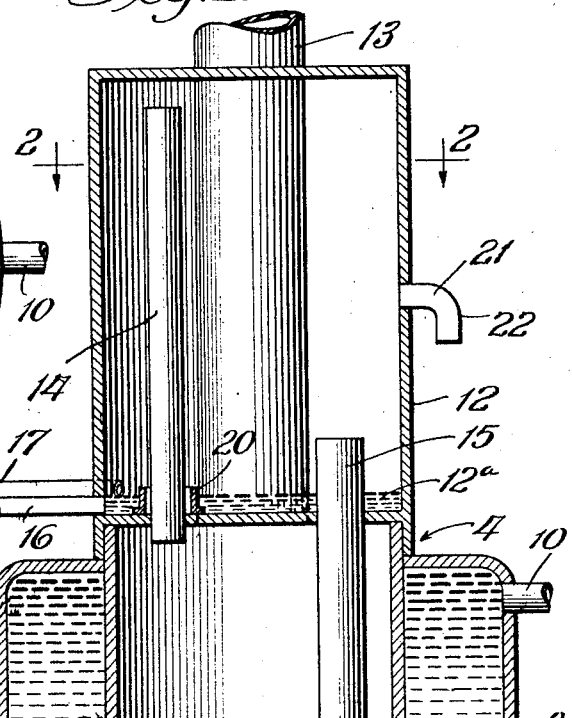
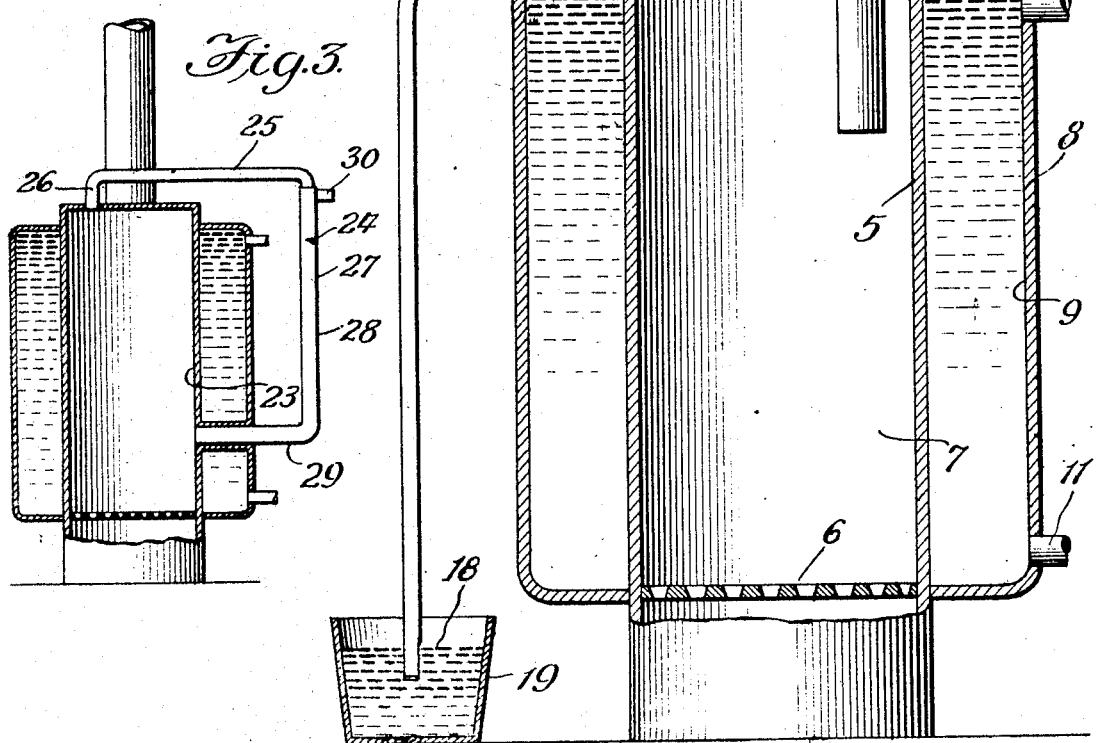
Inventor
William Ryan
By Dyrenforth, Lee, Chritton & Wiles
Attys Patented Dec. 11, 1934

1,984,157

UNITED STATES PATENT OFFICE 1,984,157

FURNACE

William Ryan, Chicago, Ill.

Application March 30, 1931, Serial No. 526,531

8 Claims. (Cl. 110—49)

My objects generally stated are to provide improvements in furnaces to the end that the heat generated by the burning fuel may be utilized to the maximum extent; and the combustion of the fuel enhanced with consequent economy in fuel consumption and avoidance of the production of smoke.

Referring to the accompanying drawing:

Figure 1 is a view in vertical sectional elevation of a furnace embodying my invention.

Figure 2 is an enlarged plan sectional view of the same, the section being taken at the line 2—2 on Fig. 1 and viewed in the direction of the arrows; and Figure 3, a view like Fig. 1 of another embodiment of my invention.

Referring to the construction shown in Figs. 1 and 2, a furnace structure, shown as of the hot-water coal-fired type, but merely by way of example, is represented at 4 and is formed of an inner shell structure 5 having a grate-section 6 forming the bottom of a combustion chamber or fire pot 7, the shell 5 being surrounded by an outer shell 8 which, with the shell 5, forms a water chamber 9 in which the water to be heated is located, the chamber 9 being connected with an outflow pipe 10 which would lead to the piping (not shown) of the radiating system to be supplied with hot water, and with a return inlet 11 through which the water would return to the chamber 9 from the piping above referred to.

The construction also comprises a drum 12 shown as mounted on the top of the combustion chamber 7 and closing the upper open end of the latter but which, if desired, may be located remote from the chamber 7, the outlet flue of the combustion chamber 7 and represented at 13 extending upwardly from the combustion chamber and through the drum 12 as for example to a chimney (not shown).

The drum 12 is provided with pipes 14 and 15 extending upwardly in, and open at their upper ends into, the drum 12. The pipe 14 extends at its lower, open, end through the bottom of the drum 12 into the combustion chamber 7 and at its upper end to within a short distance of the top of the drum 12, and the pipe 15, which is of larger internal diameter than the pipe 14, extends at its lower, open, end through the bottom of the drum 12 into the combustion chamber 7 and at its upper end a short distance above the bottom of the drum 12, the pipe 15 extending into the combustion chamber 7 to a lower level than the pipe 14. By way of example for a household furnace, the drum 12 may be 24 inches high and 15½ inches in diameter; the pipe 14, 1½ inches in diameter with its upper end 2½ inches from the top of the drum 12 and its lower end extending 2 inches below the bottom of the drum 12; and the pipe 15 may be 2 inches in diameter with its upper end projecting 4 inches above the bottom of the drum 12 and its lower end 11 inches below the bottom of the drum.

The operation of the apparatus in so far as above described is as follows:

Upon starting a fire in the furnace the air in the combustion chamber 7 by the rise in temperature becomes lighter and therefore rises into the pipe 14 displacing the heavier cooler air in the drum 12 which discharges downwardly through the pipe 15 into the combustion chamber 7 below the lower end of the pipe 14, the circulation thus established into and through the drum 12 continuing as long as the heat in the combustion chamber exceeds the temperature of the contents of the drum, such circulation thus continuing so long as heat continues to be generated in the furnace.

The circulation through the drum may be accelerated as for example by either providing cooling means for the contents of the lower portion of the drum 12, or by providing an opening in the drum 12 to the atmosphere, or a combination of these features.

The construction shown involves both of these features, the means for cooling the contents of the lower portion of the drum by water comprising an inlet pipe 16 which opens into the lower portion of the drum 12 and through which water is fed to the drum from any suitable controlled source to maintain therein a predetermined amount of water, say to a depth of about 3½ inches, as represented at 12ª, an overflow pipe represented at 17 and opening at its upper end into the drum 12 and at its lower end into a body of water 18 in a receptacle 19 being preferably provided to ensure against the rise of the water in the drum 12 above the desired level.

In connection with this water cooling feature it is to be noted that, while the contents of the lower portion of the drum 12 are to be cooled it is desired that the pipe 14 be protected against cooling in order that the gases flow from the combustion chamber into the drum in the maximum heated condition. As a means to thus protect the pipe, I provide a dam about the pipe 14 shown as in the form of a ring 20 sealed at its lower end to the bottom of the drum 12 and spaced throughout its circumference from the pipe 14 and extending above the level of the body of water to be maintained in the drum.

Provision for the supplying of air to the interior of the drum 12 is made by a pipe 21 which opens through a side of the drum 12 between the upper ends of the pipes 14 and 15, its outer end being in the form of a depending elbow 22 so that air enters this pipe at a point below its outlet into the drum, the pipe 21 by way of example being one inch in diameter and placed twelve inches above the bottom of the drum 12.

In the operation of the apparatus as above described air is sucked into the drum 12 through the pipe 21 and as this air is cooler than the gaseous fluid entering the drum 12 through the pipe 14 the temperature of the contents of the drum below the top of the pipe 14 is lowered thereby augmenting the circulation of gaseous fluid from the combustion chamber 7 to the drum 12 and from the latter back to the combustion chamber, the air thus drawn into the drum 12 becoming preheated.

One of the features of the apparatus as above stated is the augmenting of combustion within the chamber 7, which is effected by returning to this chamber portions of the gaseous fluid in the top of the chamber 7 which would otherwise pass out through the outlet flue 13 and be wasted.

Augmented combustion takes place in the absence of an air-inlet from the atmosphere direct to the drum, as for example through the pipe 21, but combustion is still further augmented by using an air inlet such as the inlet 21 because of the supply of oxygen, which is thus caused, in preheated condition, to be introduced into the combustion chamber 7.

It will furthermore be understood that by the circulation of hot gaseous fluid from the chamber 7 into the drum 12 and back to the chamber, the drum will become heated to a high degree thereby radiating heat to the atmosphere about it and utilizing this heat, which would otherwise not be usable, at least to a material degree, for useful heating.

Referring now to the modification shown in Fig. 3, a circulatory course for receiving gaseous fluid from the combustion chamber of the furnace, and which would otherwise pass into the stack, and returning it to the combustion chamber, is provided in the form of piping without employing a drum as explained of the construction of the preceding figures.

In this construction the combustion chamber of the furnace shown, and of the same construction as the furnace proper of Fig. 1, is represented at 23 and the piping forming the circulatory course referred to at 24, this piping comprising a pipe 25 extending crosswise of, and above the top of, the combustion chamber and shown as having a downturned end 26 which opens into the combustion chamber 23 through the top of the latter, and a pipe 27 of larger diameter than the pipe 25, the pipe 27 having an upwardly extending leg portion 28 which opens at its upper end into the outer end of the pipe 25 and a laterally extending leg portion 29 which leads from the lower end of the leg portion 28 into the lower part of the combustion chamber 23 through the side wall of the latter. By way of example the pipe 25 with its portion 26 may be one inch in diameter and the pipe 27 1¼ inches in diameter.

By providing the piping as described gaseous fluid in chamber 23 in the generation of heat in the latter rises into pipe 25, the cooler, heavier, air in pipe 27 flowing into the combustion chamber through the leg 29 thereby setting up a circulation of the gaseous fluid whereby it is returned to the combustion chamber for enhancing combustion of the fuel.

This arrangement also contemplates the introduction of air from the atmosphere into the piping not only to augment circulation but to supply additional preheated oxygen to the burning fuel. To this end the piping is open to the atmosphere below the pipe 25 and preferably close to the top of the pipe 27, as for example through the pipe 30 which by way of example may be one inch in diameter. In the operation of the furnace air is drawn into the piping through pipe 30 and cools the contents of down flow leg 28 accelerating circulation in the piping and supplying preheated oxygen to the combustion chamber.

While I have illustrated and described certain particular embodiments of my invention, I do not wish to be understood as intending to limit it thereto as the same may be variously modified and altered and the invention embodied in other forms without departing from the spirit of my invention.

What I claim as new, and desire to secure by Letters Patent is:

1. In a furnace, the combination with a combustion chamber occupied by hot gaseous fluid produced by ignition of fuel in the furnace, a stack in communication with said chamber, a receptacle closed to said stack, and a pipe normally open to said chamber and opening into said receptacle, said receptacle having an outlet located below the upper end of said pipe and communicating with said chamber, whereby the fluid entering said receptacle gravitates therein through said outlet back into said chamber, said receptacle containing an opening to the atmosphere below the top of said inlet pipe.

2. In a furnace, the combination with a combustion chamber occupied by hot gaseous fluid produced by ignition of fuel in the furnace, of a receptacle, a pipe normally open to said chamber and opening into said receptacle, said receptacle having an outlet located below the upper end of said pipe and communicating with said chamber, whereby the fluid entering said receptacle gravitates therein through said outlet back into said chamber, and means for cooling the gaseous contents at the bottom of said receptacle.

3. In a furnace, the combination with a combustion chamber occupied by a hot gaseous fluid produced by ignition of the fuel in the furnace, of conduits communicating with each other and opening into the combustion chamber at different levels, said conduits being normally open and normally subjected to a surrounding medium of lower temperature than the gases leaving the combustion chamber, said normally open conduits being the sole means for setting up a continuous circulatory course for a portion of the unburned gases leaving the combustion chamber, said course being open to the atmosphere between the ends thereof for adding oxygen to the continuously circulating unburned products.

4. In a furnace, the combination with a combustion chamber occupied by a hot gaseous fluid produced by ignition of the fuel in the furnace, of conduits communicating with each other and opening into the combustion chamber at different levels, said conduits being normally open and normally subjected to a surrounding medium of lower temperature than the gases leaving the combustion chamber, said normally open conduits being the sole means for setting up a continuous circulatory course for a portion of the unburned gases leaving the combustion chamber, said course being open to the atmosphere between the ends thereof for adding oxygen to the continuously circulating unburned products, said lower conduit opening into the combustion chamber at a region just above the fuel.

5. In a furnace, the combination with a combustion chamber for receiving hot gases produced by the ignition of fuel, a recirculating box, and spaced conduits opening at their upper ends into said box and at their lower ends into said combustion chamber, said combustion chamber being surrounded by a heat absorbing medium of lower temperature than the gases leaving the combustion chamber, one of said conduits extending into said box above the upper end of the other conduit and with its lower end above the lower end of said other conduit whereby to produce a continuous circulation of a portion of the unburned products of combustion upwardly from the combustion chamber through the recirculating box and back to a region just above the burning fuel, and an exhaust conduit for conducting the products of combustion from the combustion chamber to the atmosphere, said conduit being offset from the axis of the combustion chamber.

6. In a furnace, the combination with a combustion chamber for receiving hot gases produced by the ignition of fuel, a recirculating box, and spaced conduits opening at their upper ends into said box and at their lower ends into said combustion chamber, said combustion chamber being surrounded by a heat absorbing medium of lower temperature than the gases leaving the combustion chamber, one of said conduits extending into said box above the upper end of the other conduit and with its lower end above the lower end of said other conduit whereby to produce a continuous circulation of a portion of the unburned products of combustion upwardly from the combustion chamber through the recirculating box and back to a region just above the burning fuel, and an exhaust conduit for conducting the products of combustion from the combustion chamber to the atmosphere, said conduit being offset from the axis of the combustion chamber and passing through the recirculating box.

7. In a furnace, the combination with a combustion chamber for receiving hot gases produced by the ignition of fuel, a recirculating box, and spaced conduits opening at their upper ends into said box and at their lower ends into said combustion chamber, one of said conduits extending into said box above the upper end of the other conduit and with its lower end above the lower end of said other conduit whereby to produce a continuous circulation of a portion of the unburned products of combustion upwardly from the combustion chamber through the recirculating box and back to a region just above the burning fuel, and an exhaust conduit for conducting the products of combustion from the combustion chamber to the atmosphere, said conduit being offset from the axis of the combustion chamber and passing through the recirculating box.

8. In a furnace, the combination with a combustion chamber occupied by hot gases produced by ignition of fuel in the furnace, of a recirculating box, normally open conduits connecting said chamber and said box, respective inlets and outlets of said conduits in said chamber and box being at different levels to produce in combination with said box a continuous positive circulation of a portion of the combustible gases between said combustion chamber and said recirculating box, and means for positively circulating a cooling medium in heat exchange relation with the recirculating box and the conduits.

WILLIAM RYAN.